B. J. FIELD.
Churn.
No. 220,133. Patented Sept. 30, 1879.
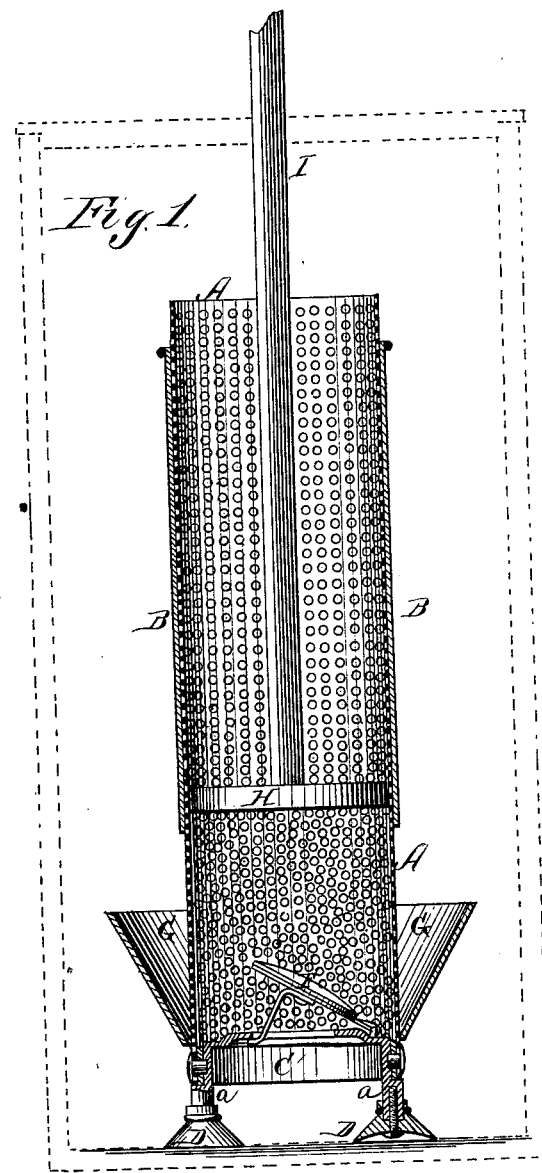
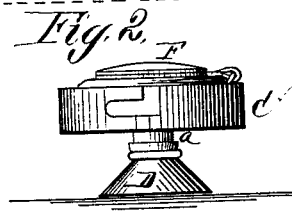
Witnesses:
Inventor
B. J. Field,
per
Alexander Elliott
Attorneys.

UNITED STATES PATENT OFFICE.

BENTON J. FIELD, OF LEAKSVILLE, NORTH CAROLINA.

IMPROVEMENT IN CHURNS.

Specification forming part of Letters Patent No. 220,133, dated September 30, 1879; application filed March 29, 1879.

*To all whom it may concern:*

Be it known that I, BENTON J. FIELD, of Leaksville, in the county of Rockingham and State of North Carolina, have invented certain new and useful Improvements in Churns; and I do hereby declare that the following is a full, clear, and exact description thereof, reference being had to the accompanying drawings, and to the letters of reference marked thereon, which form part of this specification.

The nature of my invention consists in the construction and arrangement of a churning device to be used in any ordinary churn, as will be hereinafter more fully set forth.

In order to enable others skilled in the art to which my invention appertains to make and use the same, I will now proceed to describe its construction and operation, referring to the annexed drawings, in which—

Figure 1 is a central vertical section, and Fig. 2 a side view of the base.

A represents a vertical cylinder of any suitable dimensions, made of sheet metal and perforated with numerous fine holes. Outside of this perforated cylinder A is a sheet-metal cylinder, B, which is imperforate and slides on the inner cylinder, it being sufficiently tight to remain at any height thereon by friction, without any extraneous fastening devices.

In the lower end of the perforated cylinder A is fastened a base, C, provided with three or more legs, *a a*, each of which has a rubber foot or sucker, D, fastened to it in any suitable manner that will prevent it from coming off. The base C is provided on top with a hinged valve, F, as shown.

Around the lower end of the tube or cylinder A is attached a flaring rim or cone, G. H is the piston or plunger, provided with rod I for working the same up and down in the cylinder.

By the use of the rubber suckers D my churn attachment can be easily, quickly, and securely fastened to the bottom of any ordinary churning-vessel. If this vessel is made of wood, it must have a piece of tin tacked in the bottom, as the suckers will not stick to wood. The base C is detachable for cleaning purpose.

The valve F in the base furnishes an easy passage for the milk in filling the cylinder, and obstructs its passage outward except through the perforations.

As some milk requires much more force or pressure than other milk to burst the globules, by the combination of the two cylinders the operator can regulate the force, and give the proper pressure by sliding the outside cylinder, B, up or down, thereby lessening or increasing the number of perforations, as the quality of the milk may require. If the milk is soft, the outside cylinder must be raised, and if hard lowered.

When the milk is forced through the perforations against the inside of the cone, it changes the direction of the milk upward, while the milk in the top of the churn is flowing to take its place in the bottom. This of course mixes the milk in such a manner that all must of necessity pass through the perforations, which would not be the case without the cone.

The operation is as follows: The milk is poured into the churning-vessel, and the attachment is passed down through the milk until the suckers D fasten themselves to the bottom. The outside cylinder, B, is run down to about one inch above the top of the cone. The piston is inserted, the churn-lid put on, and the piston worked up and down in the usual way.

If no signs of butter are seen in about two minutes, the outside cylinder, B, is to be run down a little every minute thereafter until the work is completed.

Having thus fully described my invention, what I claim as new, and desire to secure by Letters Patent, is—

1. The combination, with the piston H, of the perforated cylinder A and the outside movable imperforate cylinder, B, for the purposes set forth.

2. The combination of the base C with valve F, the perforated cylinder A, piston H, and the imperforate movable cylinder B, for the purposes herein set forth.

3. The suckers D, in combination with the base C, for the purposes set forth.

4. The flaring rim or cone G, in combination with the perforated cylinder A and piston H, for the purposes herein set forth.

5. The combination of the piston H, the perforated cylinder A, the imperforate movable cylinder B, the flaring rim or cone G, and the base C with valve F, substantially as and for the purposes herein set forth.

6. The combination of the perforated cylinder A and the removable base C, substantially as and for the purposes set forth.

7. The combination, with the perforated cylinder A, of the detachable base C, provided with valve F and suckers D, substantially as herein set forth.

In testimony that I claim the foregoing as my own I affix my signature in presence of two witnesses.

BENTON JEREMY FIELD.

Witnesses:
  WM. C. JONES,
  JOHN HAIZLIP.